United States Patent
Chen et al.

(10) Patent No.: US 9,990,598 B2
(45) Date of Patent: Jun. 5, 2018

(54) APPARATUSES, SYSTEMS, AND METHODS FOR PROVIDING A RULES ENGINE SYSTEM

(71) Applicant: ALLSCRIPTS SOFTWARE, LLC, Raleigh, NC (US)

(72) Inventors: Xiaofeng Jeff Chen, Alpharetta, GA (US); Jim Rushing, Cumming, GA (US)

(73) Assignee: ALLSCRIPTS SOFTWARE, LLC, Raleigh, NC (US)

( * ) Notice: Subject to any disclaimer, the term of this patent is extended or adjusted under 35 U.S.C. 154(b) by 600 days.

(21) Appl. No.: 13/768,012

(22) Filed: Feb. 15, 2013

(65) Prior Publication Data

US 2014/0236662 A1   Aug. 21, 2014

(51) Int. Cl.
   *G06Q 10/06*   (2012.01)
(52) U.S. Cl.
   CPC .............................. *G06Q 10/0633* (2013.01)
(58) Field of Classification Search
   None
   See application file for complete search history.

(56) References Cited

U.S. PATENT DOCUMENTS

| | | | |
|---|---|---|---|
| 7,333,939 B1* | 2/2008 | Stender et al. | ................... 705/4 |
| 2009/0271351 A1* | 10/2009 | Kandasamy et al. | ........... 706/47 |
| 2012/0254090 A1* | 10/2012 | Burris | .................... G06N 5/027 706/47 |
| 2012/0304310 A1* | 11/2012 | Blaisdell | ................ G06F 21/52 726/28 |
| 2013/0110295 A1* | 5/2013 | Zheng et al. | ................. 700/286 |

OTHER PUBLICATIONS

Wookey (Pub. No. US 2004/0230597 A1, Pub. Date: Nov. 18, 2004) Managing and Predicting Component Failure Based on Pattern Recognition of Subcomponent Exposure to Failure.*

* cited by examiner

*Primary Examiner* — Syling Yen
*Assistant Examiner* — Soheila (Gina) Davanlou
(74) *Attorney, Agent, or Firm* — Medley, Behrens & Lewis, LLC (57) ABSTRACT

Apparatuses, systems, methods, and computer program products are provided for that have a cross-module scope for facilitating the use and management of rules on an application level. The rules engine system is configured to accept inputs from multiple modules of an application, retrieve data from multiple modules, and cause actions to be carried out by multiple modules. A rules engine provider component of the system is isolated from a rules manager component of the system by a rules wrapper component, such that the rules manager component is unaffected by changes that are made to the rules engine provider component.

19 Claims, 8 Drawing Sheets

APPARATUSES, SYSTEMS, AND METHODS FOR PROVIDING A RULES ENGINE SYSTEM

BACKGROUND

With the continuing development of computing and telecommunications technology, there is an increase in the number of competing software products and options available for facilitating business transactions and workflow processes. For example, several software packages are commercially sold for integrating and managing automated business processes.

At the same time, today's businesses are growing larger and more complex and often require multiple software applications and computing platforms to address different aspects of their work. In some cases, the applications are designed to work together, but in other cases a particular application that is necessary to perform a particular function may be a stand-alone application, a custom-made application, or an otherwise specialized application that is incapable of communicating with or cooperating with other systems and applications.

Accordingly, there is a need in the art for improved apparatuses, systems, and methods for facilitating automated business processes across multiple systems or software applications.

BRIEF SUMMARY OF THE INVENTION

Apparatuses, systems, methods, and computer program products are provided that have a cross-module scope for facilitating the use and management of rules on an application level. In particular, embodiments of a rules engine system are provided that include a rules wrapper component that is configured to communicate with a rules manager component and a rules engine provider component. The rules engine provider component includes a plurality of rules and the rules manager component is configured to manage editing of at least one of the plurality of rules. The rules wrapper component is configured to isolate the rules manager component from the rules engine provider component such that the rules manager component is unaffected by changes to the rules engine provider component.

In some cases, the rules wrapper component may be further configured to isolate a rules service component from the rules engine provider component such that the rules service component is unaffected by changes to the rules engine provider component. The rules service component may be configured to define a user interface and to communicate with the rules manager component. The rules engine system may be configured to interact with an application server via the rules service component.

The rules wrapper component may, in some embodiments, comprise a first portion configured to communicate with the rules manager component and a second portion configured to communicate with the rules engine provider component. The first portion may comprise at least one of a rule execution function, a rule searching function, a rule creation function, a rule management function, a rule deployment function, or a rule tracking function. The functionality of the first portion may be unaffected by changes to the second portion. Each component may comprise a layer of functionality and the rules engine provider component may comprise an innermost layer of functionality.

In other embodiments, an apparatus is provided for supporting a rules engine system. The apparatus comprises at least one processor and at least one memory including computer program code. The at least one memory and the computer program code are configured to, with the processor, cause the apparatus to at least provide for communication between a rules engine provider component comprising a plurality of rules and a rules manager component configured to edit at least one of the plurality of rules. A functionality of the rules manager component may be unaffected by changes to the rules engine provider component such that the rules manager component is isolated from the rules engine provider.

In some cases, the at least one memory and the computer program code may be further configured to, with the processor, cause the apparatus to provide for communication between the rules engine system and an application server via a rules service component. The rules service component may be unaffected by changes to the rules engine provider component. Each component may comprise a layer of functionality and the rules engine provider component may comprise an innermost layer of functionality.

In still other embodiments, a method and a computer program product for interacting with a rules engine provider component are provided. The method and computer program product include accessing a plurality of rules provided by a rules engine provider component; managing editing of at least one of the plurality of rules via a rules manager component; and isolating the rules manager component from the rules engine provider component via a rules wrapper component configured to communicate with the rules manager component and the rules engine provider component, such that the rules manager component is unaffected by changes to the rules engine provider component.

In some cases, the method may further include providing for interaction with an application server via a rules service component, wherein the rules wrapper component is configured to isolate the rules service component from the rules engine provider component such that the rules service component is unaffected by changes to the rules engine provider component.

The rules wrapper component may comprise a first portion configured to communicate with the rules manager component and a second portion configured to communicate with the rules engine provider component. Furthermore, each component may be configured as a layer of functionality, and the rules engine provider component may comprise an innermost layer of functionality.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Embodiments of the present inventions now will be described more fully hereinafter with reference to the accompanying drawings, in which some, but not all embodiments of the inventions are shown. Indeed, embodiments of these inventions may be embodied in many different forms and should not be construed as limited to the embodiments set forth herein; rather, these embodiments are provided so that this disclosure will satisfy applicable legal requirements. Like reference numerals refer to like elements throughout.

Many businesses require functions to be performed by a number of employees in different departments. Often, each employee, although familiar with his or her own role in the process, may not be fully aware of the roles of others. Moreover, the need for efficiency and the large volume of business may, in some cases, create an impediment to direct communication between employees tasked with carrying out different portions of the same process.

In the context of a medical service provider, such as a hospital, for example, there may be processes in place to get information from a patient at the time of admittance regarding the patient's immediate condition, allergies, prescriptions the patient is required to take due to pre-existing conditions, insurance and payment capabilities, and so on. Information is also accumulated over the course of the patient's stay regarding test results, diagnoses, the patient's vitals, and medications administered to the patient, among other information relevant to the patient's condition. When the patient is discharged from the hospital, the patient may be counseled regarding which medications to take at home, what activities the patient may or may not engage in, what foods to eat or avoid, etc., and a follow-up visit may be recommended or scheduled to determine the status of the patient's condition. Such counseling is often directly dependent on the information collected from the patient and/or the patient's physician or nurses during the patient's stay. The individuals helping the patient during admittance, the hospital stay, and discharge are often different people, however, and it is sometimes difficult to reconcile the information given to the patient at one stage of the process with the information given at another stage of the process, as each stage of the process may have its own internal workflows and processes.

In some cases, for example, each department or group within the department may have its own computer programs to facilitate the performance of its functions. For example, a computer application may be used that has many capabilities and is organized into different modules that a customer (such as a hospital or department within the hospital, such as its pharmacy) can use for its processes. Each module may provide a functionality or a group of functionalities that a particular department or group of employees (e.g., clinical, laboratories, nursing, etc.) may find useful for carrying out its workflow processes. In this regard, each module may be considered a stand-alone product and may function independently of other modules. In addition, each module may be designed and built using a mix of technologies and architectures. For this reason, although the modules may be designed to run on top of a unified database, the modules may not be unified in their approach to solving the business's problems, and communications and data sharing between different modules may be difficult, if not impossible.

A module of an application may, for example, provide a rules engine for facilitating decision-making processes associated with whether or not to perform a certain action, and the rules engine may include a set of rules pertaining to the particular problem being addressed. Although the rules that are defined in the rules engine may be fixed, the needs of the customer using the rules engine may be ever changing.

In the context of a medical care provider, for example, medical procedure and decision logic may change faster than the rules defined in the application or the respective module (in the case of an application having several modules, for example). Moreover, there may be no universal decision-making logic for all of the modules used by the different departments or employee groupings of the medical care provider. In other words, different hospital groups, for example, may have different approaches to solving problems, and two departments may make entirely different decisions based on the same set of data.

For example, some modules may have no support for customer logic and may, rather, expect such decisions to occur outside the computer application. Some modules may use hard-coded generalized rules that all hospitals may share and may have little customized control. Still other modules may include limited data-driven, pre-defined business rules that can be adjusted by changing the data to control ranges or thresholds for making decisions.

In this regard, a rule may be a combination of conditions and actions. A rule condition may be evaluated as a result of the occurrence of a trigger (e.g., a system change). A trigger can cause multiple rules to be invoked in some cases, whereas in other cases multiple triggers may be required to invoke a single rule. In some cases, multiple triggers may be combined to create another trigger.

In general, triggers may fall under one of three different categories: event-based, data-based, and time-based. An event-based trigger is one that causes a rule condition to be evaluated due to the occurrence of an interactive, real time, on demand, or predefined system event. For example, in the context of an application for facilitating pharmacy workflow processes, an event may be the placement of an order or the deletion of an order. Thus, a rule condition may be evaluated before an order is placed, after an order is place, or after an order is deleted, for example.

A data-based trigger is one that causes a rule condition to be evaluated due to a change in system data. Data stored on the system (e.g., in a data repository) in the context of a medical care service provider application may include patient information, prescription information, and/or user information, for example. The data may be monitored at predefined times (e.g., every day at midnight) such that a change in the stored data that is detected (e.g., admittance of a new patient that is recorded in the system) triggers the evaluation of a rule condition.

A time-based trigger is one that causes a rule condition to be evaluated due the passage of a predetermined amount of time. In this case, a system timer may be used to measure the passage of specified time intervals, at which point evaluation of a rule condition may be triggered.

As noted above, triggers may be combined to create a composite trigger. For example, a time-based trigger and a data-based trigger may be combined such that a rule condition may be evaluated if a change in system data is detected at specified time intervals. Thus, at a predetermined interval of time, a check of the system data may be triggered, and if a change is detected, then the rule condition may be evaluated, as noted above.

Once a trigger is fired, a rule condition is caused to be evaluated. A rule condition may be in the form of an expression and may be a composition of multiple conditions. An example of a condition may be as follows:

if ((Condition1 and Condition2) or Condition3) then Action In some cases, expressions may support static values (such as a threshold value for a patient's blood pressure). In other cases, expressions may be dynamically created. For example, an expression may support a predefined condition that is reusable, such as the following expression:

Is_A_Smoker: Patient.SmokingStatus=ActiveSmoker

An expression may also support a parameter substitution, such as when the value of a particular variable is looked up or obtained from another source. An example may be where a patient's blood pressure (Patent.BP) is accessed from blood pressure monitoring equipment for evaluating the following expression:

if Patient.BP>150 then Action

Moreover, expressions can be combined to create more complex expressions.

Upon the evaluation of a rule condition (such as the expressions described above), an action may be performed. An action may be a complex message that will be delivered to the application (e.g., the application 10 in FIG. 1) or to a messaging dispatcher after the expression is evaluated. For example, an action may be the sounding of an alarm, the provision of a visual indication of information (such as a prompt or dialog box presented to a user) on a display, the placement of an order for medication, the sending of an e-mail message, or the triggering of an evaluation of another rule condition. The system architecture according to some embodiments may be extensible so as to support the continual addition of new types of actions as the need arises.

Figure 1:
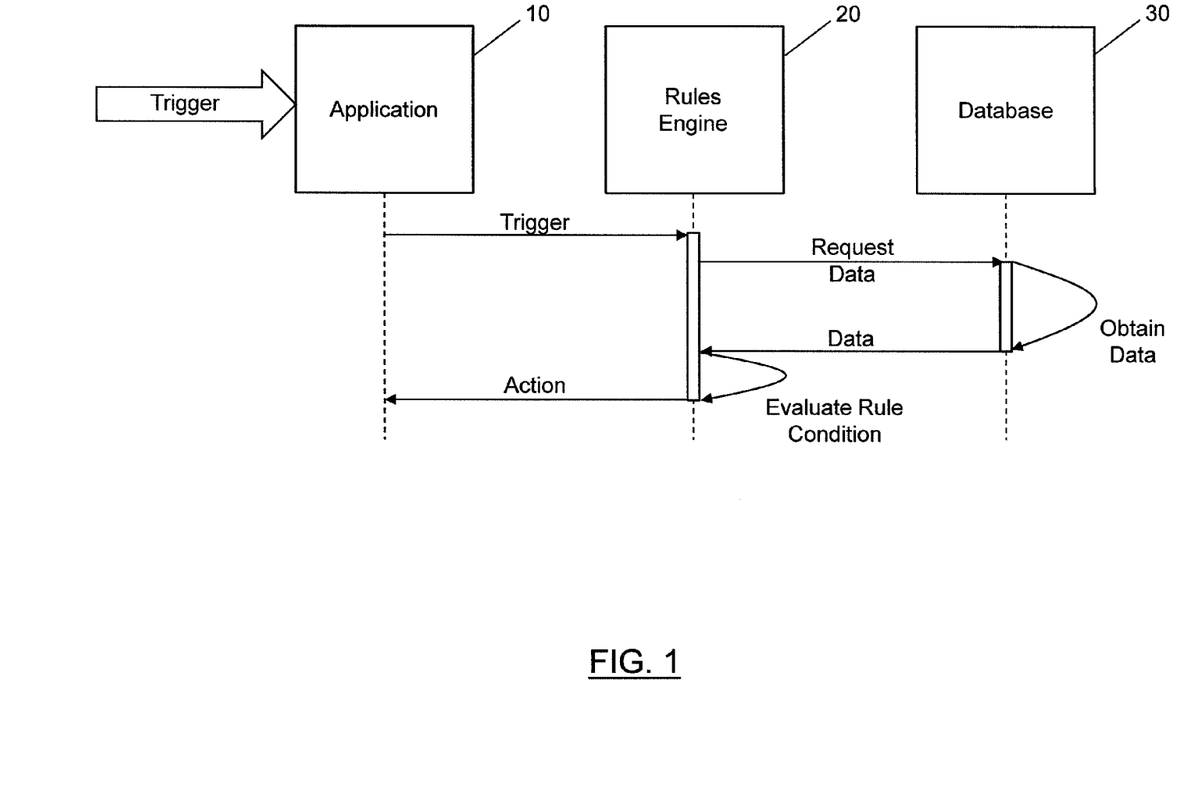
FIG. 1 illustrates a schematic diagram of interaction between system components upon the occurrence of a trigger in accordance with one exemplary embodiment.

A sequence diagram showing the interaction between a computer application 10, a rules engine 20, and a database 30 upon the occurrence of a trigger is provided in FIG. 1. As illustrated, a trigger may be detected by the application 10, and the trigger may be transmitted to a rules engine 20. As a result, and to enable the rules engine to evaluate a particular rule condition, a request for data may be sent to a database 30. The database 30 may obtain the data and transfer the data back to the rules engine 20, and the rules engine may use the data to evaluate the rule condition. An action may thus be determined and transmitted back to the application 10.

In conventional applications that include multiple modules directed to multiple different aspects of a business, such as in the medical care provider example above, the evaluation of rule conditions may result in actions that affect multiple modules. Each module, however, may be designed with its own set of rules relating to the respective department, and some modules may not support the evaluation of business rule conditions at all. In addition, each module may have its own set of data, and that data may not be shared across modules. Thus, in conventional systems, actions determined as a result of the evaluation of a rule by one module may not take into account relevant data stored within another module, and even if accurate, such actions may not be adequately represented to other modules, resulting in redundancies, inaccuracies, and inefficiencies across modules.

Accordingly, a rules engine system is provided that has a cross-module scope for facilitating the use and management of rules on an application level. In this regard, the rules engine system is configured to accept inputs from multiple modules, retrieve data from multiple modules, and cause actions to be carried out by multiple modules.

Figure 2:
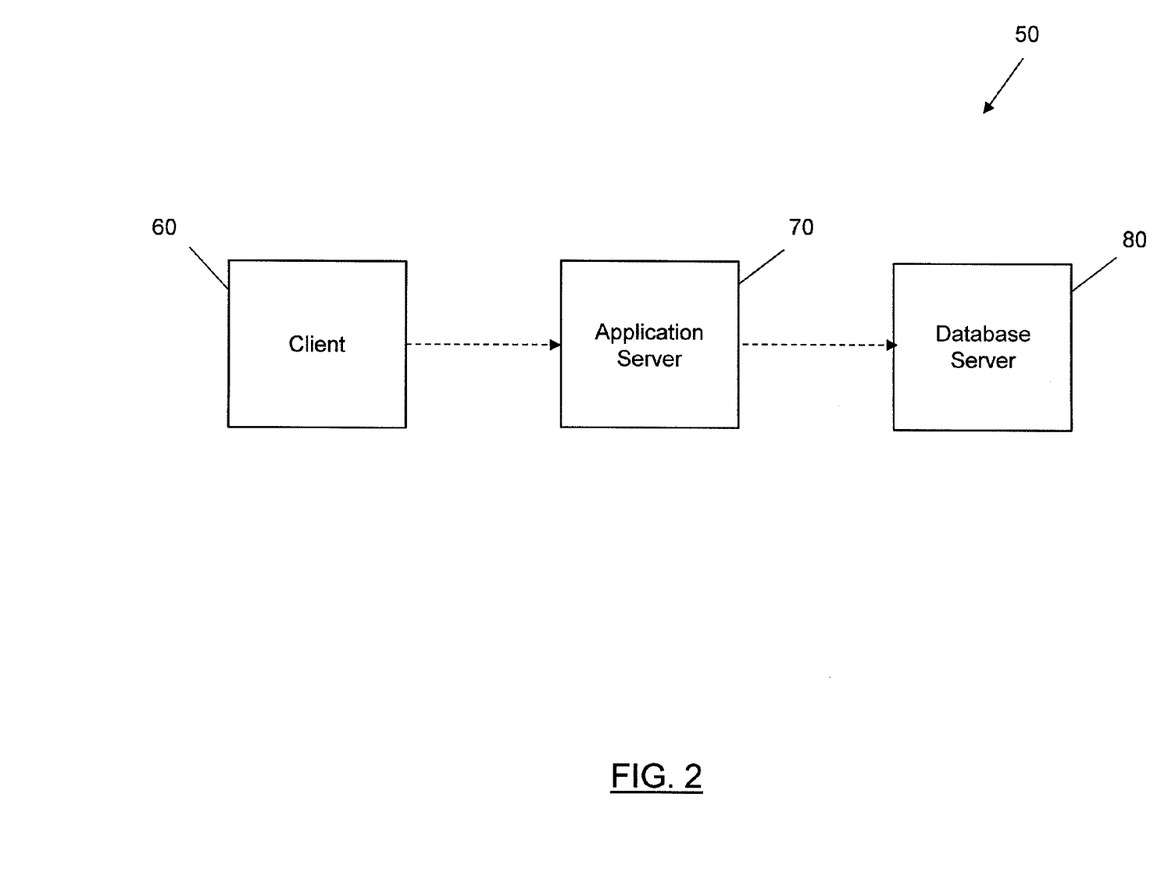
FIG. 2 illustrates a system including a Client, an Application Server, and a Database Server in accordance with one exemplary embodiment of the present invention.

With reference to FIG. 2, an architecture 50 is shown that includes a Client 60, an Application Server 70, and a Database Server 80 in communication with each other. The Client 60 may be a web client, such as when the users (e.g., pharmacists, nurses, physicians, etc.) of a medical care provider application access an application residing on the Application Server 70 using a web-based interface configured to communicate with the Application Server 70 over a network, such as the Internet. Alternatively or additionally, the Client 60 may be software that is configured to communicate with the Application Server 70 over a wired connection or wirelessly, such as via a network (e.g., the Internet).

Figure 3:
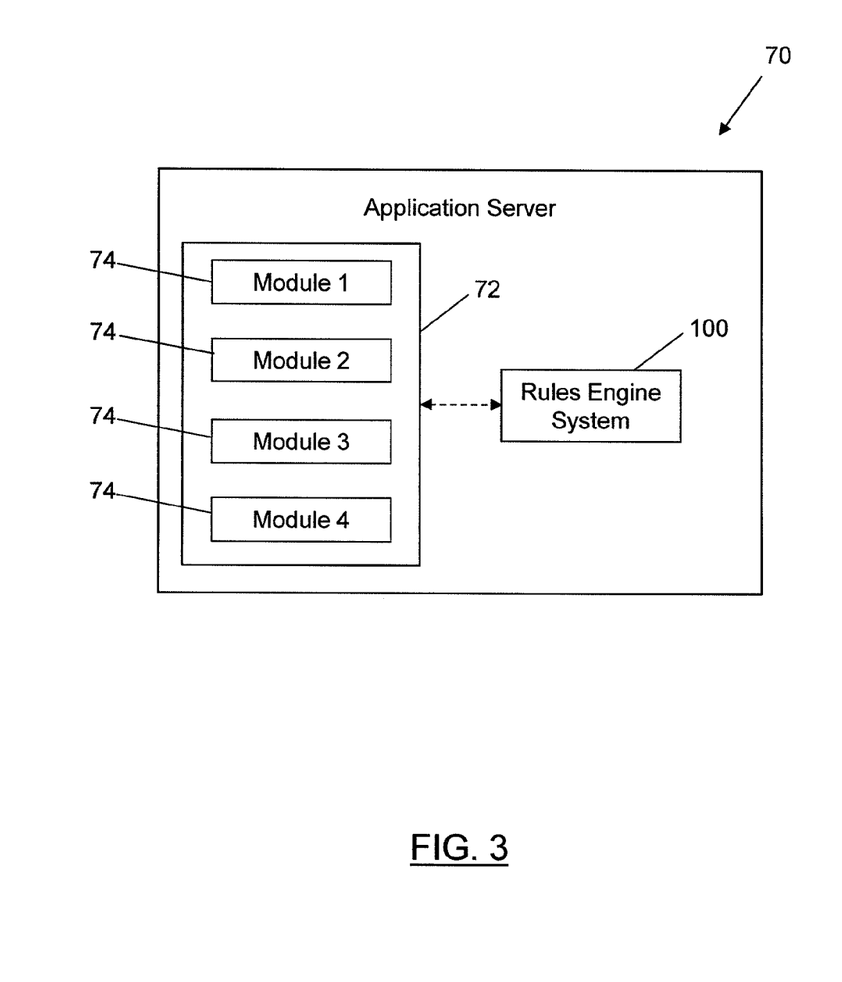
FIG. 3 illustrates components of the Application Server of FIG. 2 in accordance with one exemplary embodiment of the present invention.

The Application Server 70 may be configured to support one or more applications 72, as shown in FIG. 3. Each application 72 may, in turn, comprise multiple modules 74, as described above. In the depicted embodiment of FIG. 3, for example, the Application Server 70 has a single application 72 that includes four modules 74. The Application Server 70 may further comprise a rules engine system 100 configured according to embodiments of the invention described below. The rules engine system 100 may be configured to communicate with the application 72 and/or with the different modules 74 of the application, as described in greater detail below.

Turning again to FIG. 2, the Application Server 70, such as via the rules engine system 100, may be configured to communicate with a Database Server 80 to access system data. The system data may, for example, be used for triggering the evaluation of rules by the rules engine system of the Application Server 70, for carrying out actions determined by the rule evaluations, and for performing other functions of the architecture 50.

Figure 4:
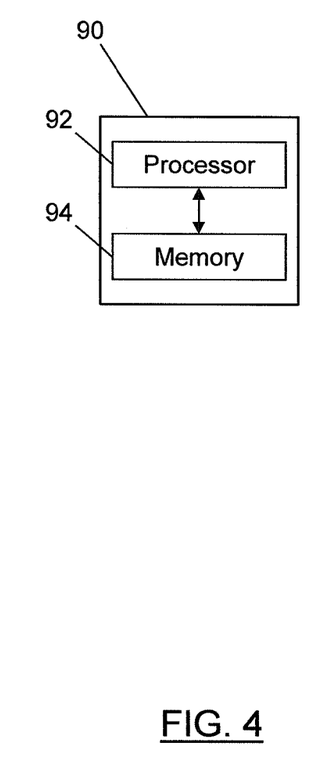
FIG. 4 is a schematic representation of an apparatus in accordance with one exemplary embodiment of the present invention.

In this regard, each of the Application Server 70 and the Database Server 80, and/or components thereof, may include or be embodied by an apparatus 90 comprising at least one processor 92 and at least one memory 94, as shown in FIG. 4. The at least one memory 94 may include computer program code, and the at least one memory and the computer program code may be configured to, with the processor, cause the apparatus to carry out certain functions of the respective apparatus, as described in greater detail below.

Figure 5:
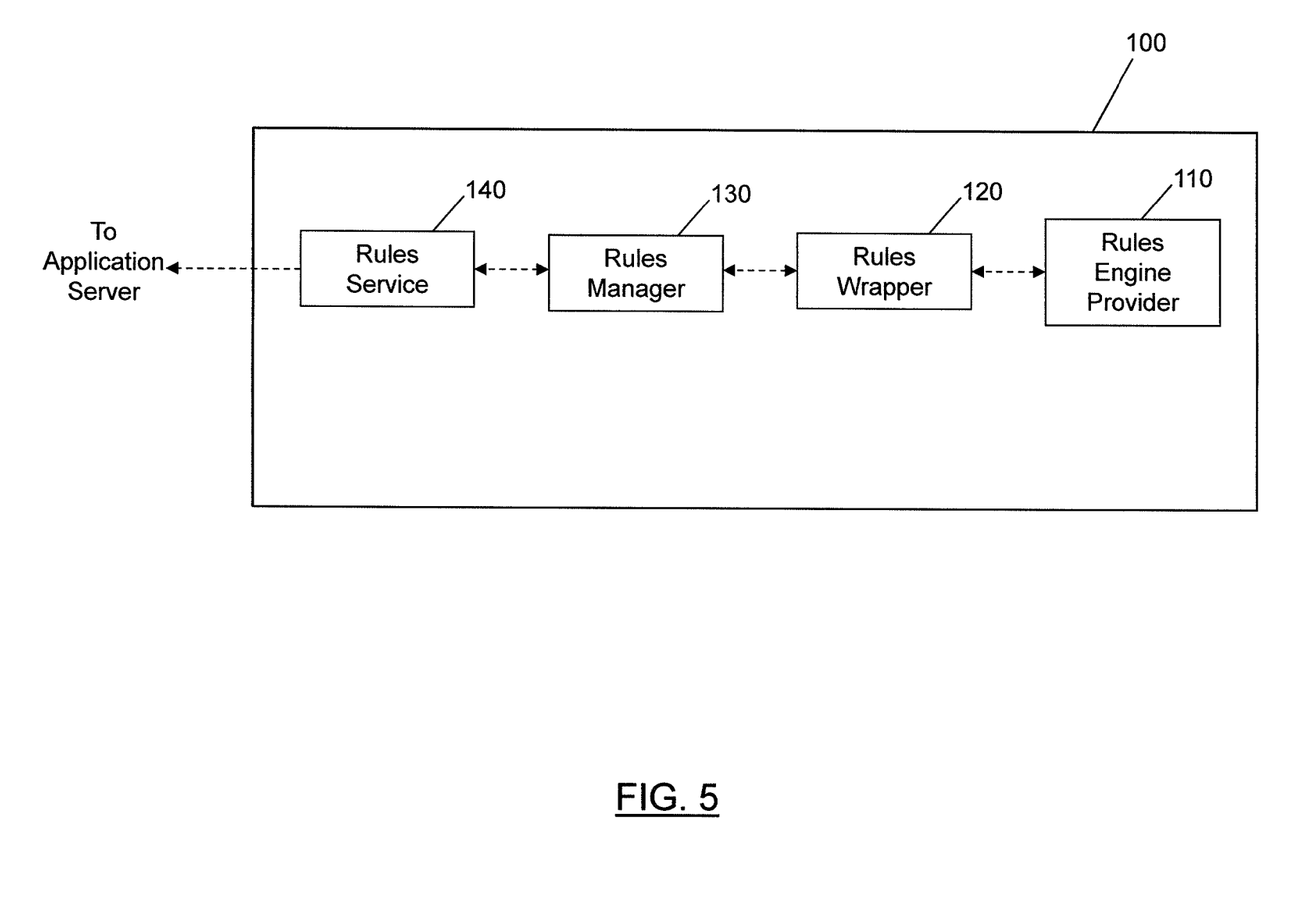
FIG. 5 is a schematic representation of the rules engine system of FIG. 3 in accordance with one exemplary embodiment of the present invention.

Turning now to FIG. 5, a rules engine system 100 is shown that includes multiple components, such as a rules engine provider component 110, a rules wrapper component 120, a rules manager component 130, and a rules service component 140. The rules engine system 100 may be part of the Application Server 70 of FIGS. 2 and 3, as described above, or may otherwise be in communication with an Application Server or its applications.

The rules engine provider 110 may comprise a plurality of rules, such as the rule conditions described above. The rules may be relevant across a number of modules 74 supported by the Application Server 70 of FIG. 3, such that the rules engine provider 110 provides a uniform and consistent source of rules across the different modules of the application 72. The rules engine provider 110 may in some cases comprise an off-the-shelf rules engine provider, such as the Microsoft® BizTalk® Server.

The rules manager component 130 may be configured to manage the editing of one or more of the plurality of rules. Management activities may include activating, deactivating, searching, deleting, creating, editing, and copying rules. The rules manager 130 may be configured to provide for the abstraction of rule processing, as well as the facilitation of other system requirements, such as the categorization of rules. Said differently, the rules manager 130 may be configured to group rules together based on the integration point or trigger point. In this way, when a trigger is detected and a decision must be made, an appropriate set of rule conditions may be accessed and evaluated. The rules may be mapped to the various triggers in some cases. In some embodiments, the rules manager 130 may be configured to provide functions including rule context, validation, rule management, vocabulary definition, data repository, exception management, notification, reporting, logging and diagnostics, and deployment functions.

Rule context functionality may include rule categorization, which may comprise categorization at a high level, as well as secondary categorization in sub-categories. Rule context functionality may also include arguments to target and run any given policy or rule, such as the policy or rule name, the results or policy/rule outcomes, and version context for the given policies and rules.

Validation functionality may include a runtime validator that is configured to perform runtime validation of the data and a processing engine to ensure system stability. Validation functionality may also be used to validate each domain object that is needed to process a rule, such as to confirm that the domain object exists and complies with the data type that conforms to its evaluation. In addition, each field must be present to ensure that the rule can be properly evaluated, the syntax of the rule must be validated for any given rules engine provider, and the field of each condition must be validated to ensure the proper evaluation of each condition to prevent data type conflicts.

Rule management functions may also be performed by the rules manager 130. Such rule management functions may include the naming of each policy or rule, the provision of a user-friendly description that is associated with each rule, version mapping of a policy or rule version, management of the organization and relevance of policies and rules (e.g., categorization), and domain entity and data access mapping. Domain entity mapping may include normalizing the rules such that rules that may have been created in different modules (and may, as a result, be called by different names and reference data elements in a variety of ways) may be represented by a common model. Data access mapping may include the mapping of objects, which may have been automatically mapped to each module's data storage, to a common data storage.

Additional rule management functions may be provided by the rules manager 130, such as the provision of a data repository. The repository may include a data model and entities used for rule authoring that are indexed for end users. Rule contexts may also be stored in the repository, and the data elements used for rule contexts may be indexed for end users. Moreover, mappings from the domain model to different modules may be stored in the repository to ensure that users are accessing and using the correct data element at design and run time.

Exception management functionality may also be provided by the rules manager 130. Exception management may include the management of client exceptions, such as, for example, rules that govern failures in the processing of rules. Details regarding the rules engine provider 110 may also be collected and shared with users to provide insight to issues with the way rules were authored via exception management functionality. In addition, this functionality may manage the retrials of rule condition evaluations, where necessary.

The rules manager 130 may, in some embodiments, provide notifications to the user, which may result from the evaluation of certain rule conditions. Such notifications may include messaging, alerts, and monitoring actions. Furthermore, certain reporting functions may be provided by the rules manager 130, which may include reporting related to the collection and/or use of statistical information regarding the architecture 50 or one or more parts of the architecture, detail tracking, usage patterns (e.g., patterns relating to the triggering of rules), source criteria used for one or more rules, and/or system monitoring details.

The rules manager 130 may also provide for certain logging and diagnostic functionality. For example, debugging information may need to be logged for quality assurance purposes, as well as rule activity details.

The rules manager 130 may also support functionality related to the deployment, running, and testing of the rules engine system 100, the importing and/or exporting of rules between and among different parts of the architecture 50, and version management and controls for managing and tracking the use of each rule over predefined time periods, such as for audit and regulatory purposes.

In conventional systems, a rules manager may be configured to communicate directly with a particular rules engine provider, such that any change in the rules engine provider would require re-configuration of at least portions of the rules manager. This may be undesirable in situations where a system is deployed to various customers with particular rules needs and preferences, as a rules engine provider that is appropriate for one customer (e.g., a particular business or department of a business) may not be the rules engine provider of choice of another customer. As a result, time and money may be unnecessarily spent in re-designing or re-working at least portions of the rules manager to accommodate the particular rules engine provider on a customer-by-customer basis.

Accordingly, embodiments of the present invention provide a rules wrapper component 120 that is configured to communicate with each of the rules manager component 130 and the rules engine provider component 110, rather than having the rules manager component 130 and the rules engine provider component 110 communicate with each other directly. The rules wrapper component 120 may be configured as described below so as to isolate the rules manager component 130 from the rules engine provider component 110. In this way, the rules manager component 130 may be unaffected by changes to the rules engine provider component 110, such as, for example, the replacement of one rules engine provider (e.g., Microsoft® BizTalk® Server) with another (e.g., InRule® business rules in the .NET Microsoft® platform, Progress® Corticon business rules server, IBM® ILOG business rules management system, Microsoft® StreamInsight processing architecture, or Drools business logic in the Java platform).

In particular, the rules wrapper component 120 may include two interfaces. One interface may be configured for interacting with the rules manager 130, and the other interface may be configured for interacting with the rules engine provider 110. The interface for communicating with the rules manager 130 may not be tied to any technology or any rules engine provider, but rather may have a standard definition that is the same as that of the Application Server 70. The interface for communicating with the rules engine provider 110 may be configured for direct communication with the rules engine provider via its application programming interface (API) or Web Services call, such that the rules engine provider can be located remotely, e.g., on the Internet or cloud. In this way, when an existing rules engine provider 110 is replaced with a different rules engine provider, although the interface of the rules wrapper component 120 for communicating with the rules engine provider may need to be changed, the interface for communicating with the rules manager 130, as well as the rules manager itself, may remain intact.

Figure 7:
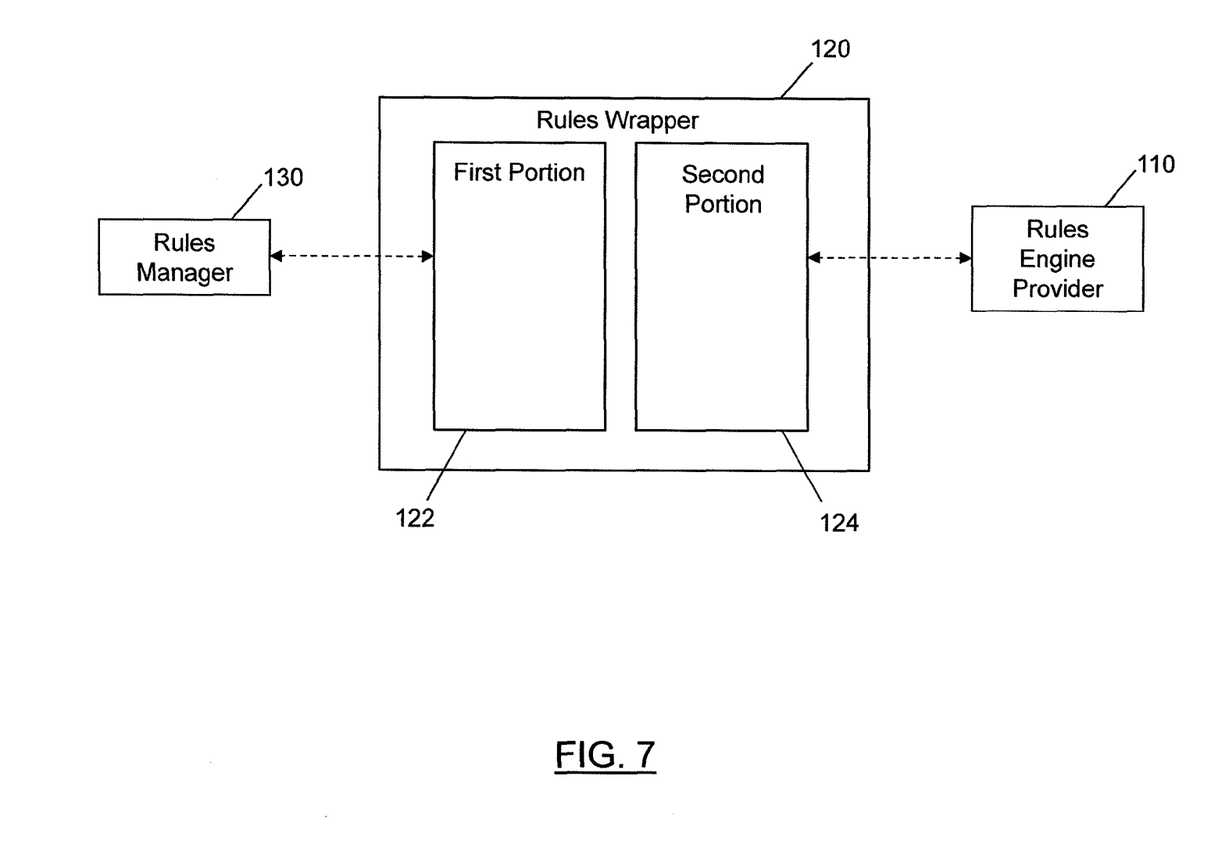
FIG. 7 is a schematic illustration of a rules wrapper component of the rules engine system of FIG. 5 according to an exemplary embodiment of the present invention.

Accordingly, in some embodiments, the rules wrapper component 120 comprises a first portion 122 (e.g., a first interface) and a second portion 124 (e.g. a second interface), as shown in FIG. 7. The first portion 122 may be configured to communicate with the rules manager component 130, and the second portion 124 may be configured to communicate with the rules engine provider component 110. The functionality of the first portion 122 may be unaffected by changes to the second portion 124.

For example, the first portion 122 that is configured to communicate with the rules manager component 130 may comprise at least one of a rule execution function, a rule searching function, a rule creation function, a rule management function, a rule deployment function, and/or a rule tracking function. In this regard, rule tracking functionality, which may be accomplished via communication with the rules manager 130, may include accessing rule names, trigger point names, rule performance data (e.g., minimum, maximum, and average performance, as well as timestamps for when the minimums and maximums occurred), the action to be taken when a rule condition is satisfied, and user inputs. Rule tracking functionality with respect to evaluating the rule condition and obtaining information regarding what facts caused the rule condition to be evaluated as true, etc., may be accomplished via communication with the rules engine provider 110.

In this regard, the rules wrapper component 120 may provide various functions that serve to isolate the rules manager component 130 from the rules engine provider component 140. For example, the rules wrapper component 120 may be configured to provide fact retrieval functions, such as to gather any data that is needed for the processing of rules (e.g., the evaluation of rule conditions as described above). Such data may be gathered from various portions of the architecture 50 of FIG. 2, such as from the Database Server 80 or the Client 60. For example, the data may comprise user inputs to the Client 60, such as inputs provided by equipment that is administering tests to a particular patient or data entered by a medical practitioner. Such data may, in some embodiments, be stored in one or more memory devices, such memory devices associated with different modules 74 of the Application Server 70 of FIG. 3.

In this regard, the rules wrapper component 120 may be configured to communicate with a fact retriever of the rules manager component 130 to access domain objects that have been retrieved by the fact retriever. Rules may be authored or created using the domain object. Moreover, facts (e.g., in the form of domain objects) may be needed for the evaluation of rule conditions. Some facts may be passed into the rules manager 130 through a rules service component 140 (discussed below), whereas some facts may be loaded or retrieved from a data repository, such as the Database Server 80. Facts that are passed into the rules manager 130 via the rules service component 140 may include context data that has not persisted to a data repository (e.g., the Database Server 80), whereas facts that are loaded or retrieved from a data repository may include persisted data and thus may not need to be passed in.

Figure 6:
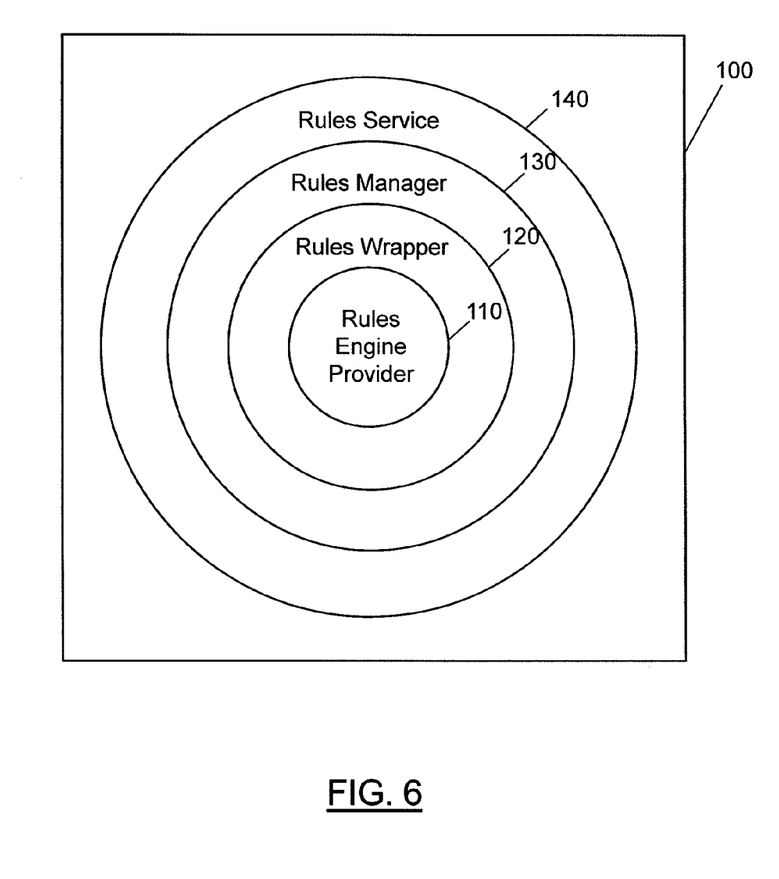
FIG. 6 is another schematic representation of the rules engine system of FIG. 3 in accordance with one exemplary embodiment of the present invention.

The rules wrapper component 120 may thus be configured to "wrap around" the rules engine provider component 110 such that the framework of the Application Server 70 of FIG. 3 is de-coupled from the rules engine provider component, and the rules engine provider component or portions of the rules engine provider component may be modified and/or replaced without necessitating changes in other portions of the Application Server 70 framework, such as the rules manager component 130 shown in FIG. 5. A schematic depiction of the "wrapping" effect of the rules wrapper component 120 is shown in FIG. 6. Accordingly, each component 110, 120, 130, 140 may comprise a layer of functionality, and the rules engine provider component 110 may comprise an innermost layer of functionality, as depicted. As shown in FIG. 5, the rules service component 140 may be configured as a top layer and, as such, may define the industry standard for the client application to make use of the overall system. The rules manager 130 may be configured as the middle layer, and, as described above, may enable various functions to be performed with respect to the rules stored in the rules engine provider 110. The rules wrapper component 120 may be configured as an inner layer with respect to the rules manager 130 and may be situated "between" the rules manager 130 and the rules engine provider 110, which may form the center, or innermost, layer of functionality as noted above.

Each layer may have its own responsibilities. For example, the rules service layer 140 may define the standard for interfacing with external applications, whereas the rules manager layer 130 may define the actual business to which the rules apply. With a layered approach, component portions of the computer program may be grouped together based on the designated responsibilities of each component, as described above, thereby facilitating maintenance of the overall system, as well as allowing for easier expansion of the system. In addition, the layered computer program can be clustered or used in a server farm, as necessary.

Referring again to FIGS. 5 and 6 and as noted above, in some embodiments, the rules engine system 100 further comprises a rules service component 140 that is configured to define a user interface and to communicate with the rules manager component 130. The rules engine system 100 may, for example, be configured to interact with the Application Server 70 or applications 72 or modules 74 supported by the Application Server via the rules service component 140. The rules wrapper component 120 may be configured to isolate the rules service component 140 from the rules engine provider component 110 such that the rules service component is unaffected by changes to the rules engine provider component.

The rules service component 140 may be, in some embodiments, a Windows Communication Foundation (WCF) tool that is configured to implement and deploy the rules engine system 100. In this regard, the rules engine system 100 may be configured to have a service-oriented architecture, such that the rules engine system supports distributed computing where services have remote consumers (e.g., in the case where the Client 60 of FIG. 2 is a web-based client).

The rules service component 140 may include functionality for addressing transport protocols, security features, configuration, transactions, and/or service metadata for supporting communications between the rules engine system 100 and other components of the Application Server 70, as well as other servers and/or clients in communication with the Application Server 70.

Accordingly, in some embodiments, an apparatus is provided for supporting a rules engine system, such as the system 100 described above. The apparatus, which may be the apparatus 90 shown in FIG. 4, may include at least one processor 92 and at least one memory 94 including computer program code. The at least one memory 94 and the computer program code may be configured to, with the processor 92, cause the apparatus 90 to at least provide for communication between a rules engine provider component 110 that includes a plurality of rules and a rules manager component 130 that is configured to edit at least one of the plurality of rules. As described above, the functionality of the rules manager component 130 may be unaffected by changes to the rules engine provider component 110 such that the rules manager component is isolated from the rules engine provider component.

The at least one memory 94 and the computer program code may be further configured to, with the processor 92, cause the apparatus 90 to provide for communication between the rules engine system 100 and an Application Server 70 via a rules service component 140. The rules service component 140 may be unaffected by changes to the rules engine provider component 110 as described above. Moreover, each component may comprise a layer of functionality, and the rules engine provider component 110 may comprise an innermost layer of functionality.

As noted above, the rules engine system 100 may be configured such that rules and data across multiple modules 74 (shown in FIG. 2) are considered and affected, thus providing a unitary and stream-lined rules engine system to the end user. In this regard, the rules engine system 100 may be configured using domain-driven design architecture, such that there are common domain objects across different components of the system. Domain services may be built on top of domain objects to provide the required functionality that is directly related to the domain objects. The use of domain services may extend business functions on top of pre-existing functionality provided by the rules engine provider component 110 while maintaining system independence with respect to the particular choice of rules engine provider (e.g., maintaining the "wrapping" effect of the rules wrapper component 120).

The rules engine system 100 may rely on core rule engine specific domain objects. In other respects, however, the system 100 may be neutral regarding the domain objects. The rules may be created using domain objects provided by different applications (e.g., the different applications 72 supported by the Application Server 70). The applications 72 may pass domain objects to the rules engine system 100 as facts. A domain specific application may provide the fact retriever through domain service. Thus, according to embodiments of the invention described above, the rules engine system 100 can be neutral to any domain and can be used by any domain application when rules service is needed. Although the domain-driven architecture is not required to implement the layered approach described above, such an architecture may facilitate the domain neutrality of the rules engine system 100.

Figure 8:
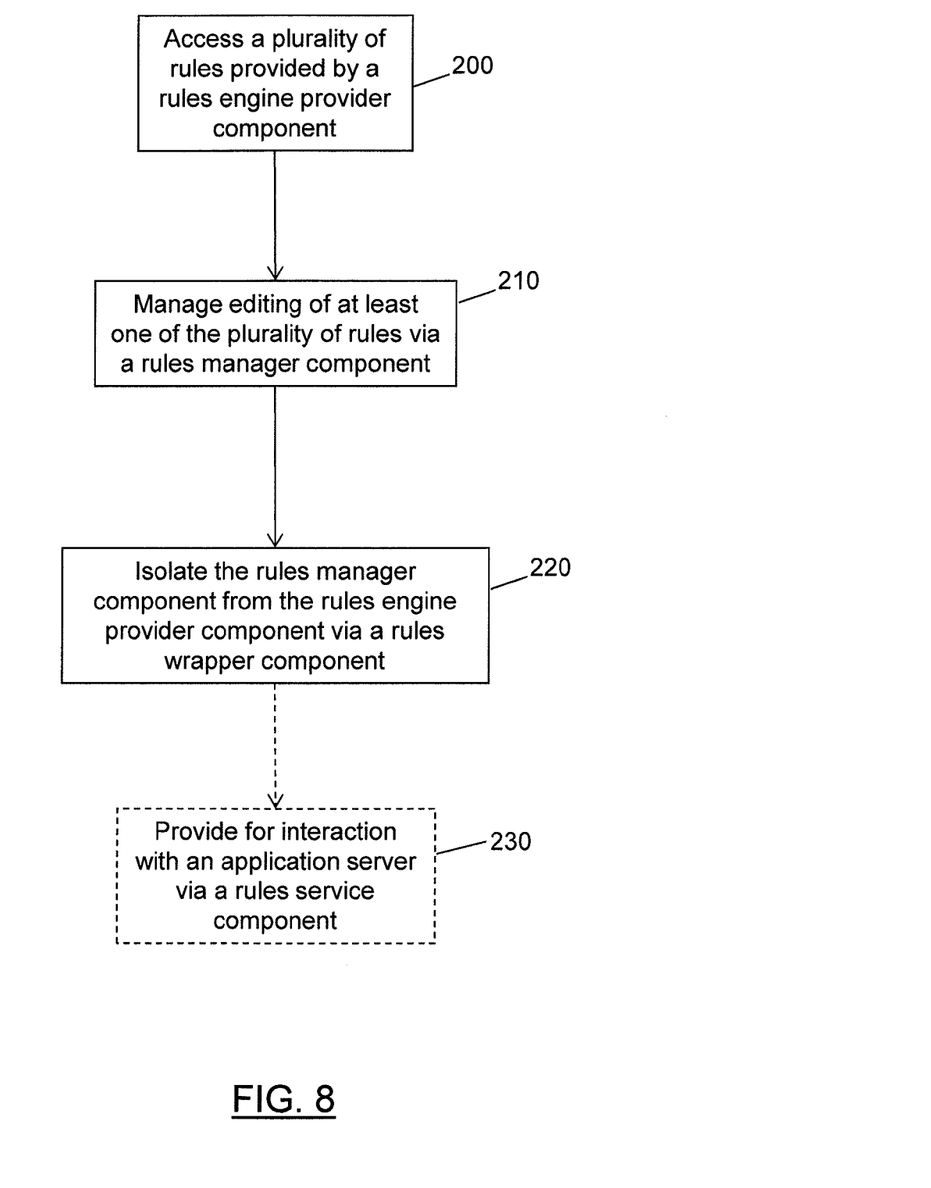
FIG. 8 is a flow chart illustrating a method of interacting with a rules engine provider component according to an exemplary embodiment of the present invention.

Referring to FIG. 8, embodiments of a method of interacting with a rules engine provider component may thus be provided. According to embodiments of the method, a plurality of rules provided by a rules engine provider component may be accessed at Block 200. Editing of at least one of the plurality of rules may be managed via a rules manager component at Block 210, and the rules manager component may be isolated from the rules engine provider component via a rules wrapper module at Block 220. The rules wrapper module may be configured to communicate with the rules manager component and the rules engine provider component, such that the rules manager component is unaffected by changes to the rules engine provider component, as described above.

In some cases, interaction with an application service via a rules service module may be provided for, as described above, at Block 230. The rules wrapper module may be configured to isolate the rules service component from the rules engine provider component such that the rules service component is unaffected by changes to the rules engine provider component. The rules wrapper component may comprise a first portion configured to communicate with the rules manager module and a second portion configured to communicate with the rules engine provider component. Furthermore, each component may be configured as a layer of functionality, wherein the rules engine provider module comprises an innermost layer of functionality.

Exemplary embodiments of the present invention have been described above with reference to block diagrams and flowchart illustrations of methods, apparatuses (e.g., systems) and computer program products. In some embodiments, certain ones of the operations above may be modified or further amplified as described below. Furthermore, in some embodiments, additional optional operations may be included, some examples of which are shown in dashed lines in FIG. 8. Modifications, additions, or amplifications to the operations above may be performed in any order and in any combination.

It will be understood that each operation, action, step and/or other types of functions shown in the diagram (FIG. 8), and/or combinations of functions in the diagram, can be implemented by various means. Means for implementing the functions of the flow diagram, combinations of the actions in the diagrams, and/or other functionality of example embodiments of the present invention described herein, may include hardware and/or a computer program product including a computer-readable storage medium (as opposed to or in addition to a computer-readable transmission medium) having one or more computer program code instructions, program instructions, or executable computer-readable program code instructions stored therein.

For example, program code instructions associated with FIG. 8 may be stored on one or more storage devices, such as a memory 94 of the apparatus 90, and executed by one or more processors, such as processor 92, shown in FIG. 4. Additionally or alternatively, one or more of the program code instructions discussed herein may be stored and/or performed by distributed components, such as those discussed in connection with system 100. As will be appreciated, any such program code instructions may be loaded onto computers, processors, other programmable apparatuses or network thereof from one or more computer-readable storage mediums to produce a particular machine, such that the particular machine becomes a means for implementing the functions of the actions discussed in connection with, e.g., FIG. 8 and/or the other drawings discussed herein. As such, FIG. 8 showing data flows may likewise represent program code instructions that may be loaded onto a computer, processor, other programmable apparatus or network thereof to produce a particular machine.

The program code instructions stored on the programmable apparatus may also be stored in a nontransitory computer-readable storage medium that can direct a computer, a processor (such as processor 92) and/or other programmable apparatus to function in a particular manner to thereby generate a particular article of manufacture. The article of manufacture becomes a means for implementing the functions of the actions discussed in connection with, e.g., FIG. 8. The program code instructions may be retrieved from a computer-readable storage medium and loaded into a computer, processor, or other programmable apparatus to configure the computer, processor, or other programmable apparatus to execute actions to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel by one or more machines, such that multiple instructions are retrieved, loaded, and/or executed together. Execution of the program code instructions may produce a computer-implemented process such that the instructions executed by the computer, processor, other programmable apparatus, or network thereof provides actions for implementing the functions specified in the actions discussed in connection with, e.g., the process illustrated in FIG. 8.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, although the description above makes reference to architecture, systems, applications, and rules in the context of a medical care provider's business, such as a hospital or pharmacy, it is understood that the embodiments described are applicable to any type of business in any field and the processes and work functions associated with such a business. Although specific terms are employed herein, they are used in a generic and descriptive sense only and not for purposes of limitation.

What is claimed is:

1. An apparatus for supporting a rules engine system, the apparatus comprising at least one processor and at least one memory including computer program code, the at least one memory and the computer program code configured to, with the processor, cause the apparatus to at least:
   provide for communication, via a rules wrapper component, between a rules engine provider component comprising a plurality of rules and a rules manager component configured to edit at least one of the plurality of rules, the rules wrapper component comprising a first portion configured to communicate with the rules manager component and a second portion configured to communicate with the rules engine provider component;
   wherein the rules wrapper component is configured to communicate with the rules manager component via the first portion to perform at least one of a rule execution function, a rule searching function, a rule creation function, a rule management function, a rule deployment function, or a rule tracking function, such that the rules wrapper component functionally isolates the rules manager component from the rules engine provider component;
   wherein the rule tracking function includes at least one of accessing rule names, trigger point names, rule performance data, an action to be taken when a rule condition is satisfied, and user inputs;
   wherein the rule tracking function evaluates the rule condition and obtains information regarding what facts caused the rule condition to be evaluated as true and is accomplished via communication with the rules engine provider component;
   wherein a functionality of the rules manager component is unaffected by changes to the rules engine provider component; and
   wherein the rules wrapper component remains the same for different rules of the rules engine provider component.

2. The apparatus of claim 1, wherein the at least one memory and the computer program code are further configured to, with the processor, cause the apparatus to provide for communication between the rules engine system and an application server via a rules service component.

3. The apparatus of claim 2, wherein the rules service component is unaffected by changes to the rules engine provider component.

4. The apparatus of claim 2, wherein the rules wrapper component is configured to de-couple a framework of the application server from the rules engine provider component of the rules engine system.

5. The apparatus of claim 1, wherein each component comprises a layer of functionality and the rules engine provider component comprises an innermost layer of functionality.

6. The apparatus of claim 1, wherein the rules wrapper component is configured to communicate with a fact retriever of the rules manager component to access domain objects that have been retrieved by the fact retriever.

7. The apparatus of claim 1, wherein the rules wrapper component is further configured to isolate a rules service component from the rules engine provider component such that the rules service component is unaffected by changes to the rules engine provider component, wherein the rules service component is configured to define a user interface and to communicate with the rules manager component.

8. The apparatus of claim 1, wherein functionality of the first portion is unaffected by changes to the second portion.

9. A method for interacting with a rules engine provider component comprising:
   accessing a plurality of rules provided by a rules engine provider component; managing editing of at least one of the plurality of rules via a rules manager component; and
   functionally isolating the rules manager component from the rules engine provider component via a rules wrapper component configured to communicate with the rules manager component and the rules engine provider component, wherein the rules wrapper component comprises a first portion configured to communicate with the rules manager component and a second portion configured to communicate with the rules engine provider component, wherein the rules wrapper component is configured to communicate with the rules manager component via the first portion to perform at least one of a rule execution function, a rule searching function, a rule creation function, a rule management function, a rule deployment function, or a rule tracking function, such that the rules manager component is unaffected by changes to the rules engine provider component, wherein the rule tracking function includes at least one of accessing rule names, trigger point names, rule performance data, an action to be taken when a rule condition is satisfied, or user inputs, wherein the rule tracking function evaluates the rule condition and obtains information regarding what facts caused the rule condition to be evaluated as true and is accomplished via communication with the rules engine provider component, wherein the rules wrapper component remains the same for different rules of the rules engine provider component.

10. The method of claim 9 further comprising providing for interaction with an application server via a rules service component, wherein the rules wrapper component is configured to isolate the rules service component from the rules engine provider component such that the rules service component is unaffected by changes to the rules engine provider component.

11. The method of claim 10, wherein the rules wrapper component is configured to de-couple a framework of the application server from the rules engine provider component of the rules engine system.

12. The method of claim 9 comprising configuring each component as a layer of functionality, wherein the rules engine provider component comprises an innermost layer of functionality.

13. The method of claim 9, wherein the rules wrapper component is configured to communicate with a fact retriever of the rules manager component to access domain objects that have been retrieved by the fact retriever.

14. A computer program product comprising at least one nontransitory computer-readable storage medium having computer-executable program code portions stored therein, the computer-executable program code portions comprising program code instructions for:

accessing a plurality of rules provided by a rules engine provider component;

managing editing of at least one of the plurality of rules via a rules manager component; and functionally isolating the rules manager component from the rules engine provider component via a rules wrapper component configured to communicate with the rules manager component and the rules engine provider component, wherein the rules wrapper component comprises a first portion configured to communicate with the rules manager component and a second portion configured to communicate with the rules engine provider component, wherein the rules wrapper component is configured to communicate with the rules manager component via the first portion to perform at least one of a rule execution function, a rule searching function, a rule creation function, a rule management function, a rule deployment function, or a rule tracking function, such that the rules manager component is unaffected by changes to the rules engine provider component, wherein the rule tracking function includes at least one of accessing rule names, trigger point names, rule performance data, an action to be taken when a rule condition is satisfied, or user inputs, wherein the rule tracking function evaluates the rule condition and obtains information regarding what facts caused the rule condition to be evaluated as true and is accomplished via communication with the rules engine provider component, wherein the rules wrapper component remains the same for different rules of the rules engine provider component.

15. The computer program product of claim 14, wherein the program code portions further comprise program code instructions configured for providing for interaction with an application server via a rules service component.

16. The computer program product of claim 15, wherein the rules wrapper component is configured to isolate the rules service component from the rules engine provider component such that the rules service component is unaffected by changes to the rules engine provider component.

17. The computer program product of claim 15, wherein the rules wrapper component is configured to de-couple a framework of the application server from the rules engine provider component of the rules engine system.

18. The computer program product of claim 14, wherein the program code portions further comprise program code instructions configured for configuring each component as a layer of functionality, wherein the rules engine provider component comprises an innermost layer of functionality.

19. The computer program product of claim 14, wherein the rules wrapper component is configured to communicate with a fact retriever of the rules manager component to access domain objects that have been retrieved by the fact retriever.

* * * * *